(12) United States Patent
Yoshikawa

(10) Patent No.: US 6,860,410 B2
(45) Date of Patent: Mar. 1, 2005

(54) POWDER AND GRAIN FEEDER

(75) Inventor: Osamu Yoshikawa, Kagoshima (JP)

(73) Assignee: Yoshikawa Corporation, Kagoshima (JP)

( * ) Notice: Subject to any disclaimer, the term of this patent is extended or adjusted under 35 U.S.C. 154(b) by 123 days.

(21) Appl. No.: 10/387,430

(22) Filed: Mar. 14, 2003

(65) Prior Publication Data

US 2003/0213815 A1 Nov. 20, 2003

(30) Foreign Application Priority Data

May 17, 2002 (JP) ........................................ 2002-142746

(51) Int. Cl.⁷ .............................................. G01F 13/00
(52) U.S. Cl. ......................... 222/239; 222/242; 222/410
(58) Field of Search ................................ 222/226, 236, 222/239–242, 410, 414

(56) References Cited

U.S. PATENT DOCUMENTS

| | | | | |
|---|---|---|---|---|
| 2,612,298 A | * | 9/1952 | Wearne ....................... 222/410 |
| 3,038,643 A | * | 6/1962 | Van Der Lely et al. .... 239/683 |
| 3,083,471 A | * | 4/1963 | Huntington ................... 34/560 |
| 3,497,139 A | * | 2/1970 | Pottgiesser et al. ......... 239/223 |
| 3,558,065 A | * | 1/1971 | Van Der Lely ............. 239/661 |
| 6,123,486 A | * | 9/2000 | Wilms et al. ................. 406/66 |

* cited by examiner

Primary Examiner—Michael Mar
Assistant Examiner—Patrick Buechner
(74) Attorney, Agent, or Firm—Leydig, Voit & Mayer, Ltd.

(57) ABSTRACT

A powder and grain feeder includes an outer cylinder and upper and lower inner cylinders sharing a centerline, the upper portion of the outer cylinder and the upper inner cylinder are connected by an upper annular plate, the lower portion of the outer cylinder and the lower portion of the lower inner cylinder are connected by a lower annular plate; a material passage is located below the outer periphery of a circular table closing the upper end of the lower inner cylinder, a material discharge gap is located between the outer periphery of the table and the lower end of the upper inner cylinder, routing blades are mounted on a rotation shaft protruding from the center of the table; the forward ends of the rotating blades are connected to the rotary ring in the material passage; a scraper for use in the material passage is mounted on the rotary ring.

7 Claims, 5 Drawing Sheets

POWDER AND GRAIN FEEDER

BACKGROUND OF THE INVENTION

1. Field of the Invention

The present invention relates to a device for stable feeding garbage, industrial waste or the like in a plant for treating household garbage, industrial waste, etc.

2. Description of the Related Art

In a conventional powder and grain feeder, inner and outer cylinders are supported on a common center line, and a powder and grain discharge gap is formed between the bottom plate of the outer cylinder and the lower end of the inner cylinder; the upper end portion of a rotation shaft protrudes from the central portion of the bottom plate of the outer cylinder, and a plurality of rotating arms are provided on the upper end portion; the outer ends of the arms are connected to a rotary ring extending along the inner wall of the outer cylinder; the ring is equipped with a plurality of scraping claws directed toward the central portion of the bottom plate; and powder and grain supplied to the inner cylinder is discharged from the above-mentioned gap to an annular passage between the inner and outer cylinders while forming an angle of repose, and the angle-of-repose portion is pushed toward a discharge outlet by the scraping claws to effect quantitative discharge.

In the above-mentioned conventional device, it is difficult to contain unpulverized pieces of plastic bags and vegetable tops in the inner cylinder and feed them in a quantitative manner.

With the conventional device such pieces catch on the rotary arms, adversely affecting passage through the gap to clog and reduce flow to the passage between the inner and outer cylinders, etc.

SUMMARY OF THE INVENTION

It is an object of the present invention to provide a powder and grain feeder for stable feeding of trash, industrial waste, etc. in a powder and grain treating plant where waste of non-uniform shape such as household garbage and industrial waste are fed to a conveyor, a furnace, etc. in a stable manner.

According to the present invention, there is provided a powder and grain feeder including:

an outer cylinder, an upper inner cylinder, and a lower inner cylinder which share a center line;

an upper annular plate connecting the upper portion of the outer cylinder and the upper inner cylinder;

a lower annular plate connecting the lower portion of the outer cylinder and the lower portion of the lower inner cylinder; and a circular table closing the upper end of the lower inner cylinder and having an erect rotation shaft with a plurality of rotating blades, in which a material passage is formed below the outer periphery of the circular table, and in which a material discharge gap is formed between the outer periphery of the circular table and the lower end of the upper inner cylinder, the powder and grain feeder further including: a rotary ring arranged in the material passage and connected to the forward ends of the rotating blades by metal fixtures; and a scraper provided in the material passage and connected to the rotary ring.

DESCRIPTION OF THE PREFERRED EMBODIMENTS

Figure 1:
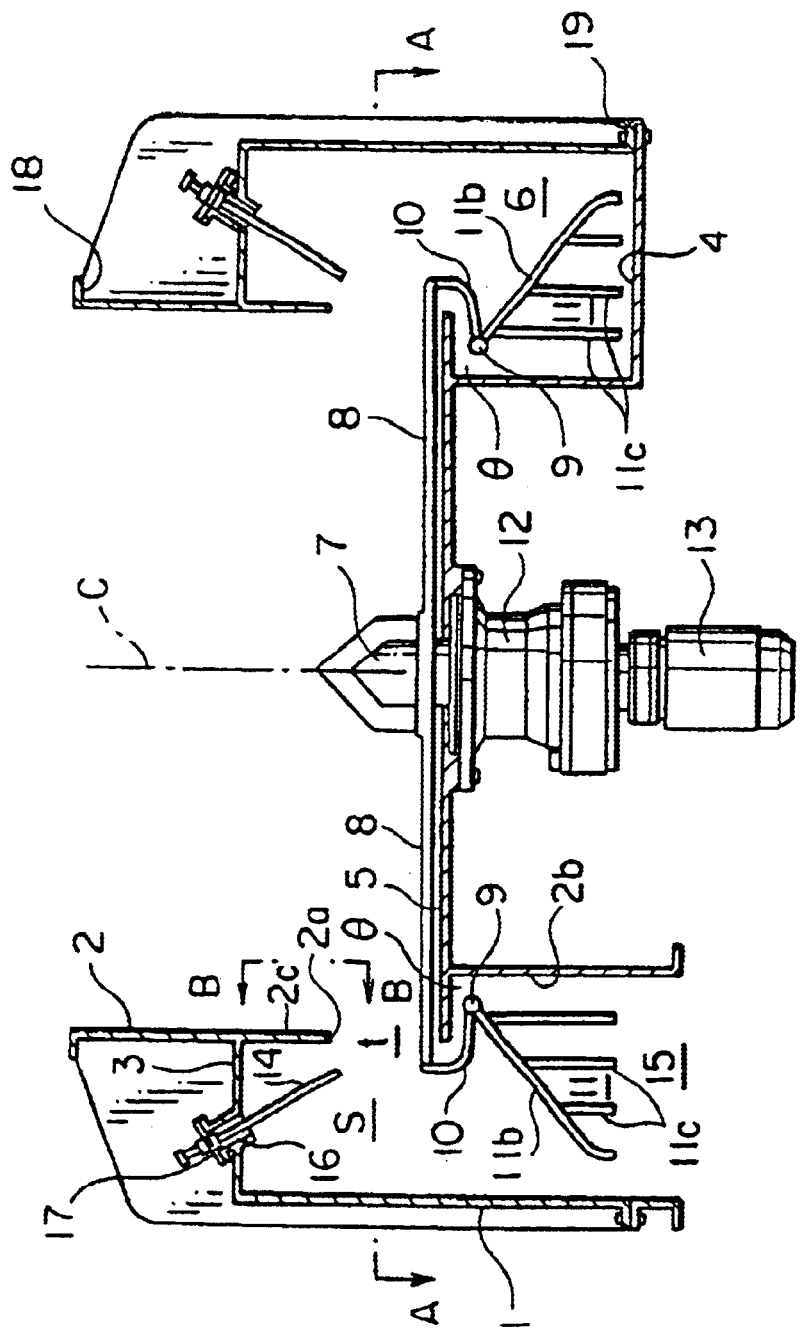
FIG. 1 is a longitudinal front sectional view of a powder and grain feeder of the present invention.
Figure 2A:
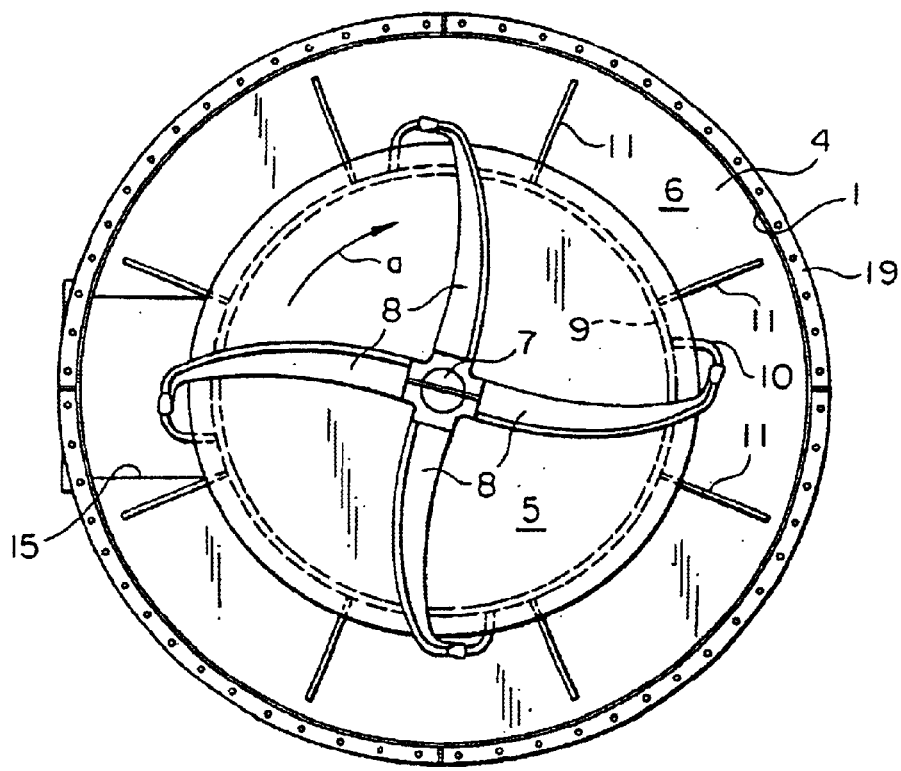
FIG. 2A is a plan view taken along the line II—II of FIG. 1.
Figure 2B:
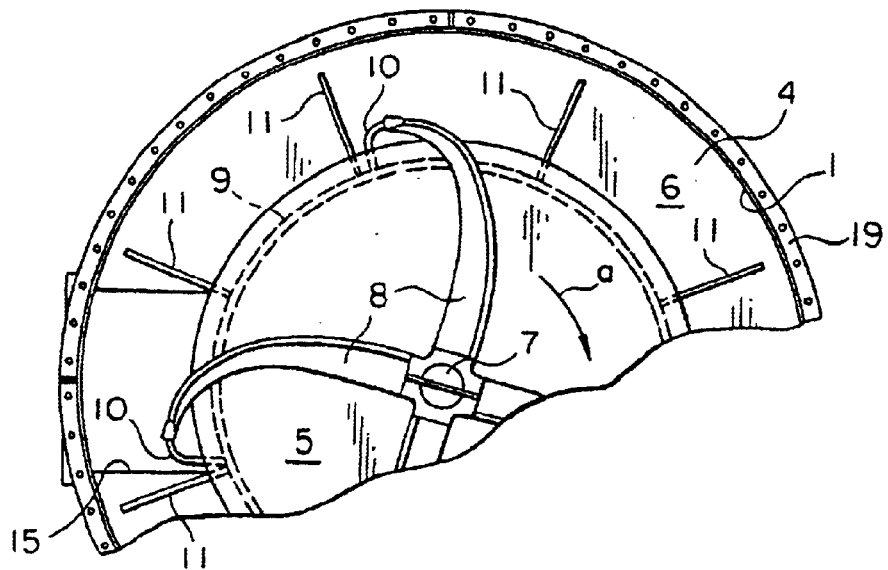
FIG. 2B is a partial plan view taken along the line II—II of FIG. 1, showing another embodiment.

A powder and grain feeder includes an outer cylinder 1 and upper and lower inner cylinders 2 and 2b spaced apart from each other and sharing a vertical center line c with the outer cylinder 1.

The upper portion of the outer cylinder 1 is integrally connected to the outer surface of the upper inner cylinder 2 through the intermediation of an upper annular plate 3 to define an upper annular space S.

The lower portion of the outer cylinder 1 is integrally connected to the lower portion of the lower inner cylinder 2b through the intermediation of a lower annular plate 4 to define a lower annular space (material passage 6).

The upper end of the lower inner cylinder 2b is closed by a concentric circular table 5, and the material passage 6 is formed by the lower annular space in the lower portion of the outer periphery of the table 5.

As shown in FIG. 1, the inner diameter of the upper inner cylinder 2 is larger than the outer diameter of the lower inner cylinder 2b, and the outer diameter of the table 5 is the same as the outer diameter of the upper inner cylinder 2. It is to be noted, however, that the relationship between the inner and outer diameters of the upper and lower inner cylinders 2 and 2b and the outer diameter of the table 5 is to be appropriately selected according to the material used; it is not restricted to the one shown in FIG. 1.

Between the lower surface of the outer periphery of the table 5 and the outer peripheral surface of the lower inner cylinder 2b, there is formed an intersection angular recess portion θ.

Further, between the lower end 2c of the upper inner cylinder 2 and the upper surface of the outer periphery of the table 5, there exists a material discharge gap t.

Below the central portion of the lower surface of the table 5, there is provided a driving electric motor 13 through the intermediation of a speed reduction gear 12, and the output shaft of the speed reduction gear 12 protrudes beyond the table 5 to form an erect rotation shaft 7.

As shown in FIG. 1, the base end portions of a plurality of (four to six) rotating blades 8 are integrally connected to the rotation shaft 7. The forward ends of the rotating blades are connected by metal fixtures 10 to a rotary ring 9 arranged in the intersection angular recess portion θ.

The rotating blades 8 are curved so as to be convex in the rotating direction a. The radius of curvature gradually decreases from the base ends toward the forward ends. It is also possible for the rotating blades 8 to have a fixed radius of curvature or to be straight.

Figure 5A:
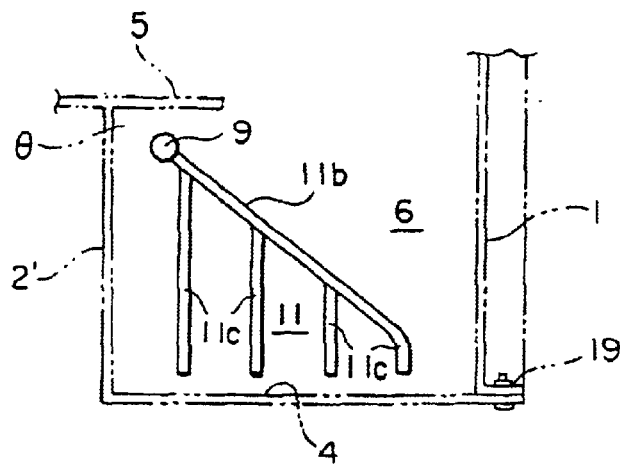
FIGS. 5A, 5B, and 5C are front views of embodiments of a scraper.
Figure 5B:
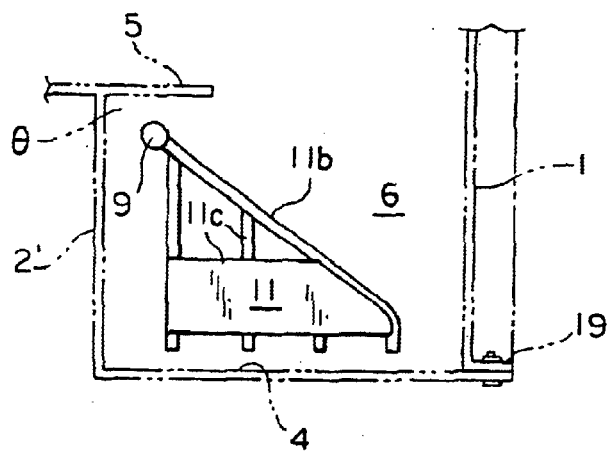
Figure 5C:
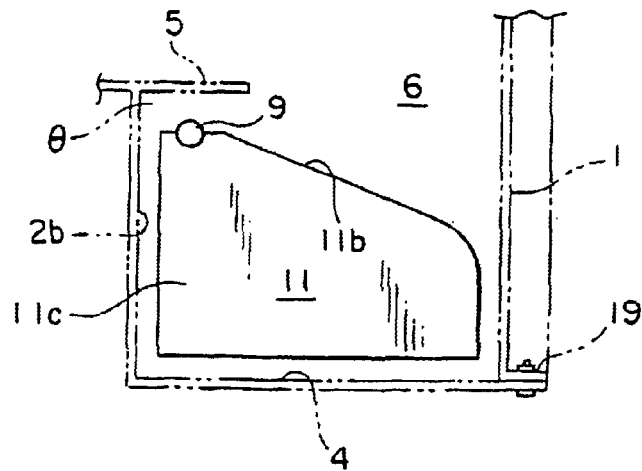

The ring 9 is equipped with scrapers 11 arranged at equal intervals in the material passage 6. Each scraper 11 is composed of a descent guide rod 11*b* inclined outwardly toward the exterior of the material passage 6 and scraping claws or scraping plates 11*c* extending vertically downwards from the guide rod 11*b*. As shown in FIG. 5C, it is also possible to tilt the upper end of the scraping plate 11*c* to form it as a descent guide edge 11*b*.

Figure 3:
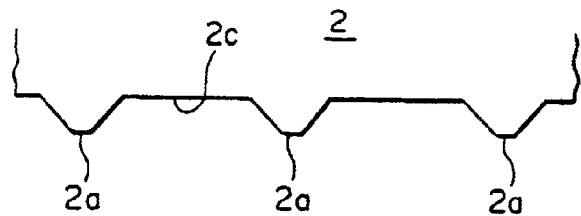
FIG. 3 is a partial inner view taken along the line III—III of FIG. 1.
Figure 4A:
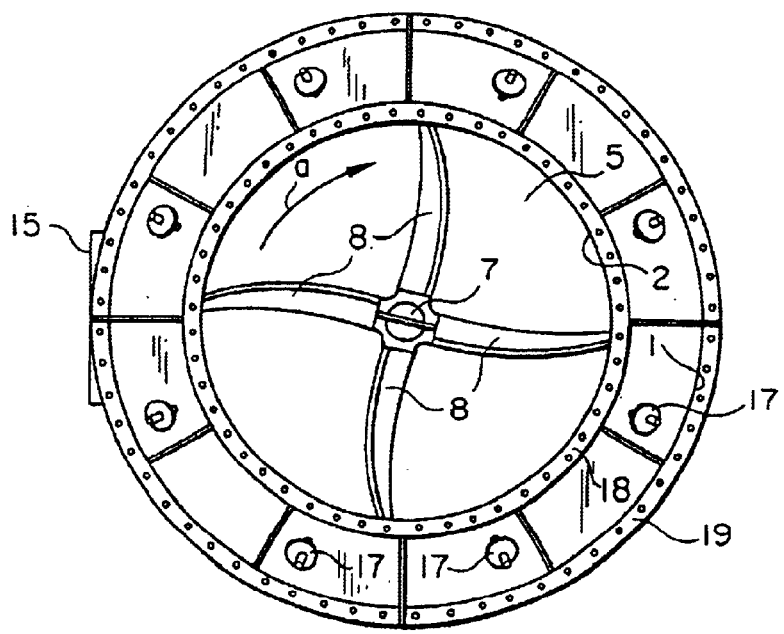
FIG. 4A is a plan view of FIG. 1.
Figure 4B:
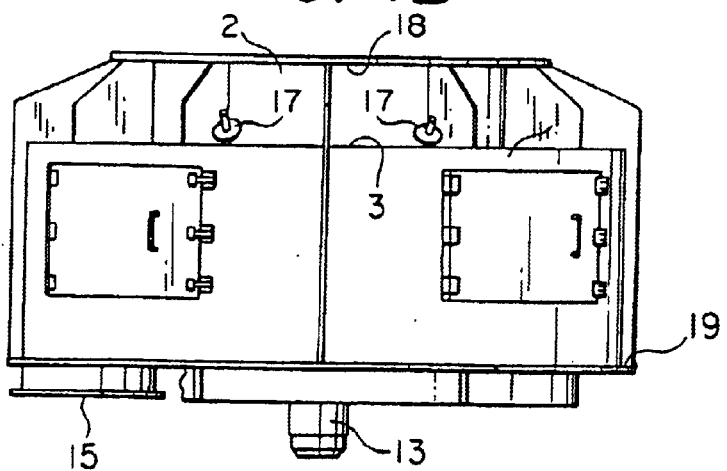
FIG. 4B is a front view of FIG. 4A.

As shown in FIG. 3, at the lower end 2*c* of the upper inner cylinder 2, a plurality of downwardly directed protrusions 2*a* are formed at equal intervals. They arrest the non-uniform shaped material urged to slide in the discharge gap t by the rotating blades 8 and push the material toward the discharge gap t side.

Provided in the upper annular space s defined by the upper inner cylinder 2, the outer cylinder 1, and the upper annular plate 3 are auxiliary metal members 14 for discharging the material moving toward the lower end 2*c* of the upper inner cylinder 2 or the discharge gap t. They arrest the non-uniform shaped waste material sliding along the gap t, and aid or promote its movement to the exterior of the gap t.

Figure 6:
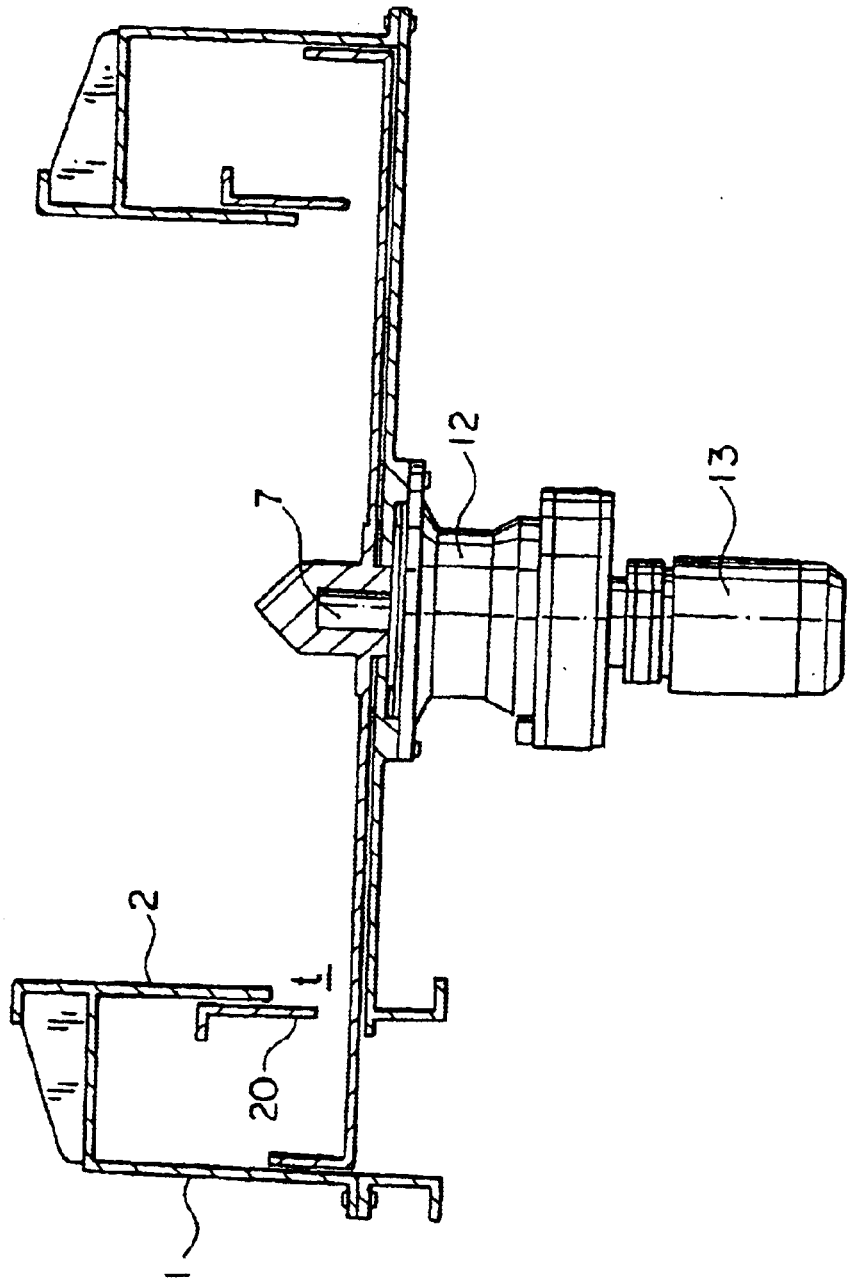
FIG. 6 is a longitudinal front sectional view of a conventional powder and grain feeder.

In FIG. 1, numeral 15 indicates a material discharge outlet provided in the material passage 6, numeral 16 indicates insertion support holes for the auxiliary metal members 14, numeral 17 indicates stoppers for the metal fixtures 14, numeral 18 indicates the upper end flange of the upper inner cylinder 2, and numeral 19 indicates the lower end flange of the outer cylinder 1. In FIG. 6, numeral 20 indicates a conventional gap adjusting cylinder.

In the powder and grain feeder of the present invention, constructed as described above, when a non-uniform shaped material such as household garbage or industrial waste is thrown into the upper inner cylinder, and the rotating blades are rotated in one direction, the non-uniform shaped material moves easily outwards along the rotating blades or along the curved surfaces thereof. In the case in which the radius of curvature decreases near the outer periphery of the table, the material is easily pushed outwards through the discharge gap to fall into the material passage. There is no fear of the material sliding along the discharge gap. The sliding is arrested by the downwardly directed protrusions or the auxiliary metal members, and the material easily falls into the material passage below. Further, the material is guided into the passage by the scrapers which facilitates the quantitative discharge from the material passage to the exterior of the device without clogging.

What is claimed is:

1. A powder and grain feeder comprising:

an outer cylinder, an upper inner cylinder, and a lower inner cylinder which share a center line;

an upper annular plate connecting an upper portion of the outer cylinder and the upper inner cylinder;

a lower annular plate connecting a lower portion of the outer cylinder and a lower portion of the lower inner cylinder;

a circular table closing an upper end of the lower inner cylinder and having an erect rotation shaft with a plurality of rotating blades, wherein a material passage is located below an outer periphery of the circular table, and a material discharge gap is located between the outer periphery of the circular table and a lower end of the upper inner cylinder, a rotary ring located in the material passage and connected to forward ends of the rotating blades by metal fixtures; and a scraper located in the material passage and connected to the rotary ring.

2. The powder and grain feeder according to claim 1, wherein the rotating blades have a radius of curvature gradually diminishing toward the forward ends of the rotating blades.

3. The powder and grain feeder according to claim 1, including a plurality of downwardly directed protrusions located at the lower end of the upper inner cylinder.

4. The powder and grain feeder according to claim 1, including a material discharging auxiliary metal member directed toward the lower end of the upper inner cylinder and located in an upper annular space defined by the upper inner cylinder, the outer cylinder, and the upper annular plate.

5. The powder and grain feeder according to claim 1, wherein the rotary ring is located in an angular recess formed by the lower inner cylinder and the circular table, and the scraper includes a descent guide inclined outwardly, downwards from the ring, and a scraping claw extending vertically from a guide rod.

6. The powder and grain feeder according to claim 1, including a material discharging auxiliary metal member directed toward the discharge gap and located in an upper annular space defined by the upper inner cylinder, the outer cylinder, and the upper annular plate.

7. The powder and grain feeder according to claim 1, wherein the rotary ring is located in an angular recess formed by the lower inner cylinder and the circular table, and the scraper includes a descent guide inclined outwardly, downwards from the ring, and a scraping plate extending vertically from a guide rod.

* * * * *